US009171212B2

(12) United States Patent
Rosswog et al.

(10) Patent No.: US 9,171,212 B2
(45) Date of Patent: Oct. 27, 2015

(54) AUTOMATIC DETECTION OF SWARM ATTACKS

(75) Inventors: James C. Rosswog, Owego, NY (US); Thomas Norton, Endwell, NY (US); Larry Holmquist, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 419 days.

(21) Appl. No.: 13/435,429

(22) Filed: Mar. 30, 2012

(65) Prior Publication Data

US 2013/0259300 A1 Oct. 3, 2013

(51) Int. Cl.
*G06K 9/00* (2006.01)
*G06N 5/04* (2006.01)

(52) U.S. Cl.
CPC .......... *G06K 9/0063* (2013.01); *G06K 9/00785* (2013.01); *G06N 5/04* (2013.01)

(58) Field of Classification Search
None
See application file for complete search history.

(56) References Cited

U.S. PATENT DOCUMENTS

| 5,379,044 A | * | 1/1995 | Carlson et al. | 342/90 |
| 7,983,878 B1 | * | 7/2011 | Denis | 702/188 |
| 2007/0216566 A1 | * | 9/2007 | Wood | 342/41 |

OTHER PUBLICATIONS

Blackman, Samuel S. "Multiple hypothesis tracking for multiple target tracking." Aerospace and Electronic Systems Magazine, IEEE 19.1 (2004): 5-18.*
Rhodes, Bradley J., Neil A. Bomberger, and Majid Zandipour. "Probabilistic associative learning of vessel motion patterns at multiple spatial scales for maritime situation awareness." Information Fusion, 2007 10th International Conference on. IEEE, 2007.*
Hu, Weiming, et al. "Traffic accident prediction using 3-D model-based vehicle tracking." Vehicular Technology, IEEE Transactions on 53.3 (2004): 677-694.*

* cited by examiner

*Primary Examiner* — Bhavesh Mehta
*Assistant Examiner* — Raphael Schwartz
(74) *Attorney, Agent, or Firm* — Wolf, Greenfield & Sacks, P.C.

(57) ABSTRACT

Methods and apparatus for detecting a swarm attack based on a plurality of convergence hypotheses related to correlated movements of entities in an area of interest. Projected tracks for the entities are determined based on position reports received for the entities. At least one of the convergence hypotheses are updated based, at least in part on the projected tracks and a convergence hypotheses is output when a score assigned to the hypothesis exceeds a threshold value.

20 Claims, 10 Drawing Sheets

AUTOMATIC DETECTION OF SWARM ATTACKS

BACKGROUND

Swarm style attacks have been used successfully throughout history by guerrilla and insurgent forces to disrupt larger and better equipped adversaries. In a swarm attack insurgent forces often rely on stealth, dispersion, and concealment to get within close range of their target and then attack from many directions. Modern urban battlefield environments contribute to the effectiveness of swarm attacks as attackers attempt to blend in with the civilian population to get within close range of their target. Other crowded environments also provide cover for swarm attacks including crowded harbors in which small boats can use disguise and speed to get within close range of larger military ships and overwhelm the larger ship with small weapons fire from many small boats.

Some conventional methods for detecting swarm attacks compare observed behaviors of potential enemy entities against a limited number of predefined templates describing known swarm attack scenarios. A swarm attack is detected when the observed behavior sufficiently matches the expected activity described in one or more of the templates.

SUMMARY

Some embodiments of the present invention are directed to a method of detecting a swarm attack. The method comprises receiving a position report for at least one entity that is being tracked within an area of interest; determining with at least one processor, a projected track of the at least one entity based, at least in part, on a position history of the at least one entity; updating at least one convergence hypothesis based, at least in part, on the determined projected track of the at least one entity; and outputting the updated at least one convergence hypothesis as a possible swarm attack when a score assigned to the updated at least one hypothesis exceeds a threshold value.

Some embodiments are directed to a computer-readable storage medium encoded with a plurality of instructions that when executed by at least one processor perform a method. The method comprises receiving a position report for at least one entity that is being tracked within an area of interest; determining, with at least one processor, a projected track of the at least one entity based, at least in part, on a position history of the at least one entity; updating at least one convergence hypothesis based, at least in part, on the determined projected track of the at least one entity; and outputting the updated at least one convergence hypothesis as a possible swarm attack when a score assigned to the updated at least one hypothesis exceeds a threshold value.

Some embodiments are directed to at least one storage device configured to store a plurality of convergence hypotheses used in detecting a swarm attack; and at least one processor programmed to: receive a position report for at least one entity that is being tracked within an area of interest; determine a projected track of the at least one entity based, at least in part, on a position history of the at least one entity; update at least one convergence hypothesis based, at least in part, on the determined projected track of the at least one entity; and output the updated at least one convergence hypothesis as a possible swarm attack when a score assigned to the updated at least one hypothesis exceeds a threshold value.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present disclosure generally relates to inventive methods and apparatus for detecting swarm attacks by detecting sets of entities that are moving toward a common location or area in space and time. Although a particular set of entities may be identified as participants in a swarm attack because they are moving toward a common location, the extent to which the individual entities in the set are working together to converge on the common location is not a limiting factor for embodiments of the invention.

As discussed above, some conventional techniques for detecting swarm attacks compare observed behaviors of enemy entities to predefined templates describing different known swarm scenarios to detect a possible swarm attack. However, such approaches are inflexible because enemy behaviors that are not captured by the templates may not be detected and swarm attacks may not be detected quickly enough to provide an effective response to the swarm attack.

Additionally, templates may not take into consideration factors related to densely-populated environments, which make detecting swarm attacks difficult.

The inventors have recognized and appreciated that conventional methods for detecting swarm attacks may be improved by detecting and tracking the correlated movements of multiple entities in an area of interest and using a statistical approach to formulate convergence hypotheses that model the behavior of the multiple entities. By removing the constraints imposed by conventional template-based swarm attack detection systems, it may be possible to detect a larger range of attacks and to discover the existence of potential swarm attacks prior to engagement with the enemy entities. Accordingly, some embodiments of the invention relate to methods and apparatus for detecting swarm attacks using convergence hypotheses that are updated based on entity reports describing movements of a plurality of entities in an area of interest.

Figure 1:
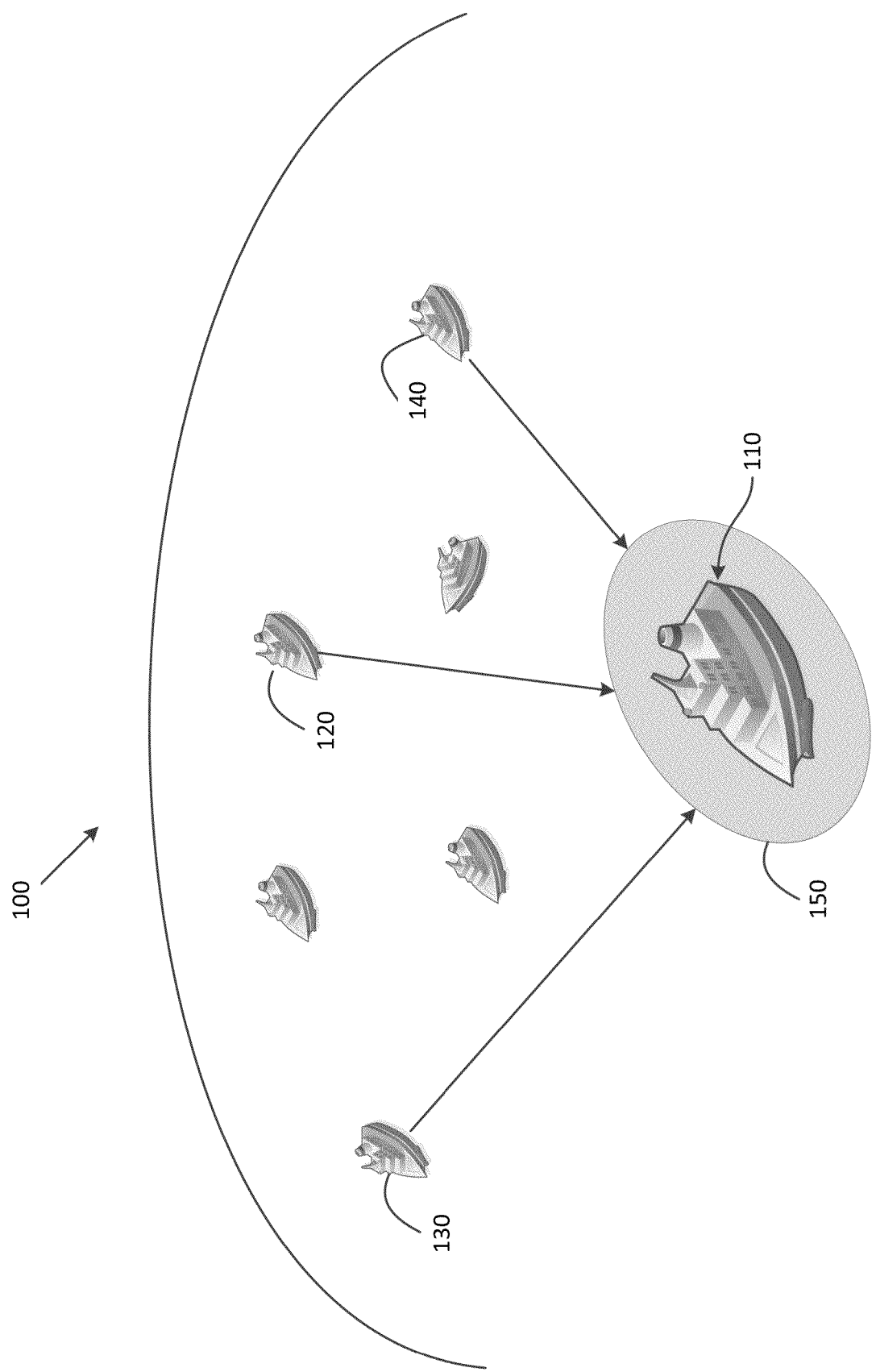
FIG. 1 is an illustration of an exemplary scenario in which some embodiments of the invention may be implemented.

FIG. 1 illustrates an exemplary scenario in which some embodiments of the invention may be employed. In the exemplary scenario of FIG. 1, the area of interest may be a littoral environment including military ship 110 that resides in a crowded harbor region 100. Harbor region 100 may also include other entities including boats 120, 130, and 140 amongst other civil fishing and shipping vessels. The positions of some or all of the entities in the harbor region 100, such as the position of boats 120, 130, and 140 may be tracked using a suitable position-tracking device and information regarding the position of each entity may be used to periodically update one or more convergence hypotheses which describe the correlated behavior of the entities in space and time with respect to converging on military ship 110.

Although some of the examples described herein relate to detecting swarm attacks on a ship operating in a littoral environment, it should be appreciated that embodiments of the invention are not limited for use in such a scenario, but may be applicable to any type of scenario where detecting swarm attacks may be useful. In particular, crowded environments including, but not limited to, urban environments and landing zone selection environments may benefit from the convergence hypotheses methods and apparatus for detecting a swarm attack described herein. For example, during troop insertion and combat search and rescue missions, a landing zone is often selected from several candidate landing zones. Some embodiments of the invention may assist in selecting a landing zone location based, at least in part, on the swarm attack risk associated with one or more of the candidate landing zones. Furthermore, although some examples described herein are simplified to include convergence hypotheses of multiple entities toward a single target, it should be appreciated that embodiments in which convergence hypotheses for multiple targets are considered are also contemplated by aspects of the present invention.

Figure 2:
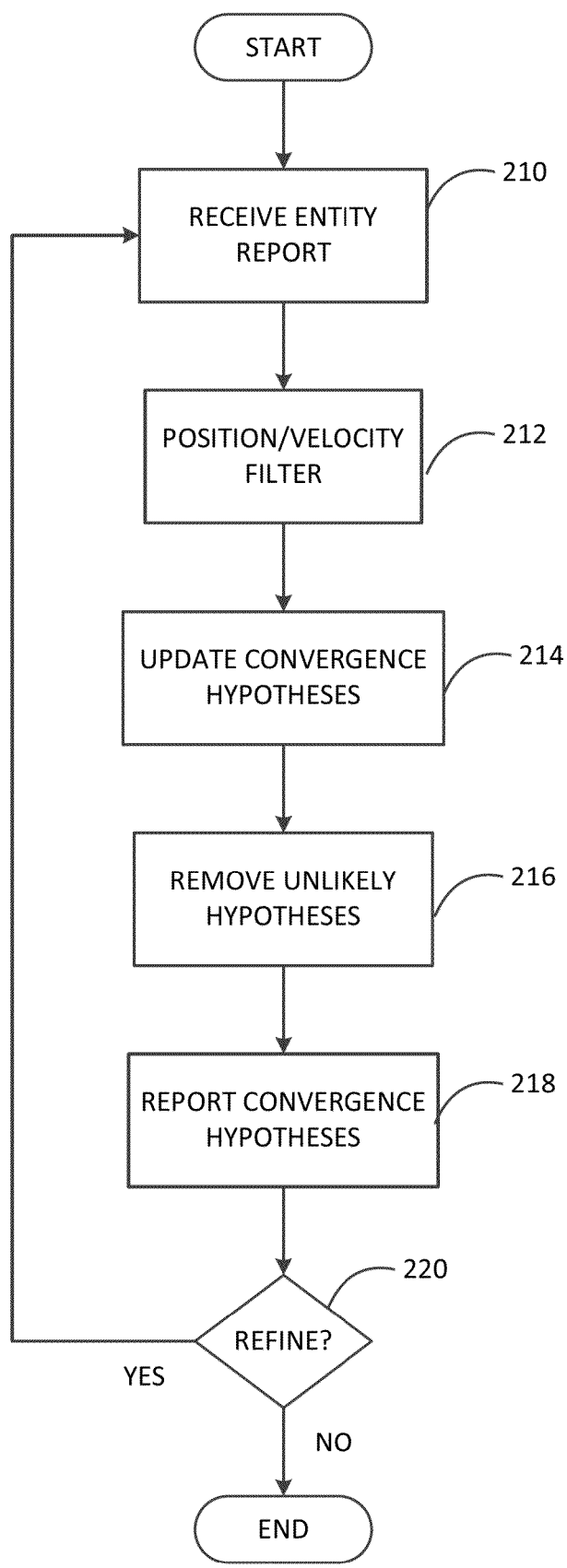
FIG. 2 is a flow chart of a process for detecting swarm attacks in accordance with some embodiments of the invention.

Some embodiments of the invention are directed at maintaining and evaluating a set of convergence hypotheses that describe the collective behavior of multiple entities in an area of interest over a specified period of time. By evaluating the collective behavior of multiple entities, it may be determined whether the entities are converging to a single location in space and time. FIG. 2 illustrates an exemplary process for automatic detection of swarm attack in accordance with some embodiments of the invention. In act 210, an entity report describing a current position of an entity in an area of interest is received by one or more computers used to implement some embodiments of the invention. For example, in the scenario illustrated in FIG. 1, the location of each of boats 120, 130, and 140 may be monitored using a location-tracking technology such as a global positioning satellite (GPS) device and the determined location of an entity at a particular time may be included in an entity report that is used to update one or more convergence hypotheses for detecting a swarm attack.

In response to receiving at least one entity report, the process proceeds to act 212 where a projected track (e.g., speed and direction) of the entity is determined based on the received entity report and historical position data. Some embodiments may employ a velocity filter that uses received entity reports to determine a projected track for each of a plurality of entities that are being monitored. The velocity filter may be configured to determine the projected track for each entity based, at least in part, on a plurality of information sources. As discussed above, one of these information sources may be stored historical information regarding the position and/or direction of an entity that may be used to determine a projected track that takes into consideration the current position of the entity described in the received entity report.

The velocity filter may also determine a projected track based on other information sources including, but not limited to, the type of entity and the type of environment in which the entity is operating in. For example, some types of entities may have their movement restricted based on the capabilities of the entity itself. In the example, of FIG. 1, boats 120, 130, and 140 may have projected tracks that are constrained to paths along the surface of the water in any direction where there is open water. However, the velocity filter may determine that an aircraft operating as an entity in this environment may have projected tracks that are less constrained, such that the aircraft can change its elevation, direction, and speed. Another example, is a land-based vehicle such as a truck that is traveling along a road in a city environment. The velocity filter may determine the projected tracks of such an entity based, at least in part, on mapping information used to constrain projected tracks along roads or terrain described by the mapping information. Other constraints may be used by the velocity filter to determine projected tracks of entities in the area of interest and embodiments of the invention are not limited in this respect. For example, in some embodiments the velocity filter may be configured to identify and resolve errors in entity reports and/or the velocity filter may be configured to identify indirect or deceptive movements by entities when determining the projected tracks for each entity.

After determining a projected track for one or more entities in the area of interest, the process proceeds to act 214 where at least one convergence hypothesis is updated or created using the determined projected track(s). In some embodiments, a set of convergence hypotheses for a particular scenario may be stored by one or more storage devices associated with one or more computers configured to implement at least some of the swarm attack detection methods described herein. Each hypothesis in the set of hypotheses may include information about a plurality of entities in an area of interest. In some embodiments, a convergence hypothesis may be implemented using one or more data structures that include fields for describing elements of the convergence hypothesis.

Figure 3:
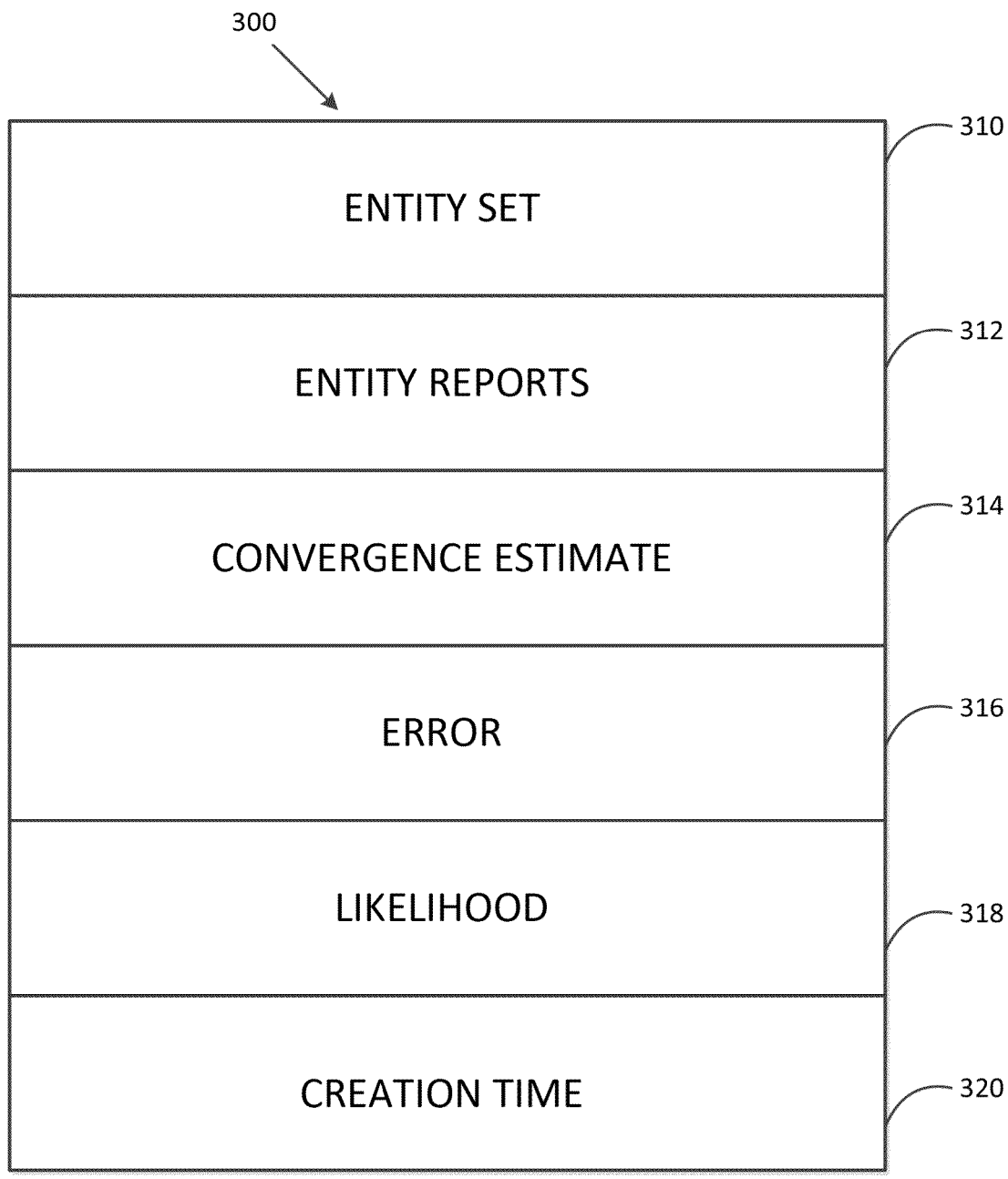
FIG. 3 is an exemplary data structure used to store information about a convergence hypothesis in accordance with some embodiments of the invention.

An exemplary convergence hypothesis data structure 300 is illustrated in FIG. 3. Data structure 300 may include a plurality of fields for storing information related to the hypothesis. Information in the different fields may be associated or linked in any suitable way as would be understood by one of skill in the art. Entity set field 310 includes identifying information for the set of entities included in the hypothesis. In some embodiments, as hypotheses are updated, some entities may be removed from the convergence hypothesis and/or new entities may be added to the hypothesis based on the received entity reports. Entity report field 312 includes identifiers for a plurality of entity reports that support the hypothesis associated with data structure 300. Convergence estimate field 314 includes information related to an estimate of a location where and/or time when the entities in the entity set are converging based on the hypothesis. The convergence estimate may be specified in any suitable way and may include any suitable convergence information including, but not limited to, latitude, longitude, altitude, and convergence time. Error field 316 includes information related to the location estimate described in convergence estimate field 314. In some embodiments, error field 316 includes a location estimate error covariance matrix that describes the error covariance for each of a plurality of parameters used to determine the location estimate. Likelihood field 318 includes information representing a likelihood that the hypothesis is correct. In one embodiment, the likelihood may be a log likelihood, although any other measure of likelihood may alternatively be used. In some embodiments, a likelihood measure specified in likelihood field 318 may be used as a score that is compared to a predetermined threshold. The score may be used to determine whether to output the hypothesis as a possible swarm attack to enable a targeted entity to respond to the possible swarm attack before the entities in the hypothesis engage the targeted entity. Data structure 300 also includes creation time field 320 that includes a time when the hypothesis was created. As discussed in further detail below, to reduce the need for system resources, one or more hypotheses may be removed from a set of hypotheses based, at least in part, on the time when the one or more hypotheses was created. Although a specific data structure has been described for storing data related to a convergence hypothesis, it should be appreciated that any suitable type of data structure or data structures may be used with the same, fewer, or additional fields for storing data related to a convergence hypothesis and embodiments of the invention are not limited in this respect.

Returning to the process of FIG. 2, at least some of the projected track(s) for entities determined in act 212 may be used in act 214 to update one or more of the stored convergence hypotheses in the set and/or to add a new convergence hypothesis to the set of convergence hypotheses for a particular scenario as discussed in more detail below.

After updating a set of convergence hypotheses, the process proceeds to act 216 where it is determined whether one or more convergence hypotheses in the set of hypotheses may be removed. In an ideal case, all possible convergence hypotheses would be maintained and updated in response to the reception of entity reports. Although this may be possible in some applications, the inventors have recognized that maintaining all hypotheses may be computationally infeasible for some applications where storage resources are limited. Accordingly, in act 216, a process may be employed to reduce the number of stored hypotheses in the set of hypotheses based, at least in part, on one or more heuristics. As discussed in more detail below, these heuristics may enable some embodiments to discard hypotheses that are unlikely to guarantee a real-time response rate to the swarm attack and/or discard hypotheses that are too old or have a low likelihood of being correct. Moreover, the number of hypotheses in the set may be reduced by identifying and condensing the number of similar hypotheses.

The process then proceeds to act 218 where it is determined whether any of the hypotheses in the set of hypotheses should be output to an operator of the targeted entity to enable the operator to respond to the swarm attack threat. In some embodiments, this determination may be made based, at least in part, on whether a score assigned to a particular hypothesis is greater than a predetermined threshold value. For example, the targeted entity may be military ship 110 in the scenario illustrated in FIG. 1, and it may be determined in act 218 to output a hypothesis to an operator of military ship 110 when the score associated with the hypothesis (e.g., corresponding to the size of the ellipse 150) is above or below a particular threshold value. In other embodiments, the hypothesis in the set of hypotheses associated with the largest score may be output to the operator of the target entity with or without a measure of the likelihood that the hypothesis is correct. Other criteria may additionally or alternatively be used in determining whether to output one or more convergence hypotheses as discussed in more detail below.

The process then proceeds to act 220 where it is determined if the convergence hypotheses should be further refined based on more received entity reports. If it is determined in act 220 that the set of hypotheses should be refined the process returns to act 210 where a new entity report is used to update the set of convergence hypotheses as discussed above. If it is determined in act 220 that no further refinement of the convergence hypotheses is needed, the process ends. Detailed aspects of some embodiments related to each of the processes illustrated in the flow chart of FIG. 2 is now described.

Figure 4:
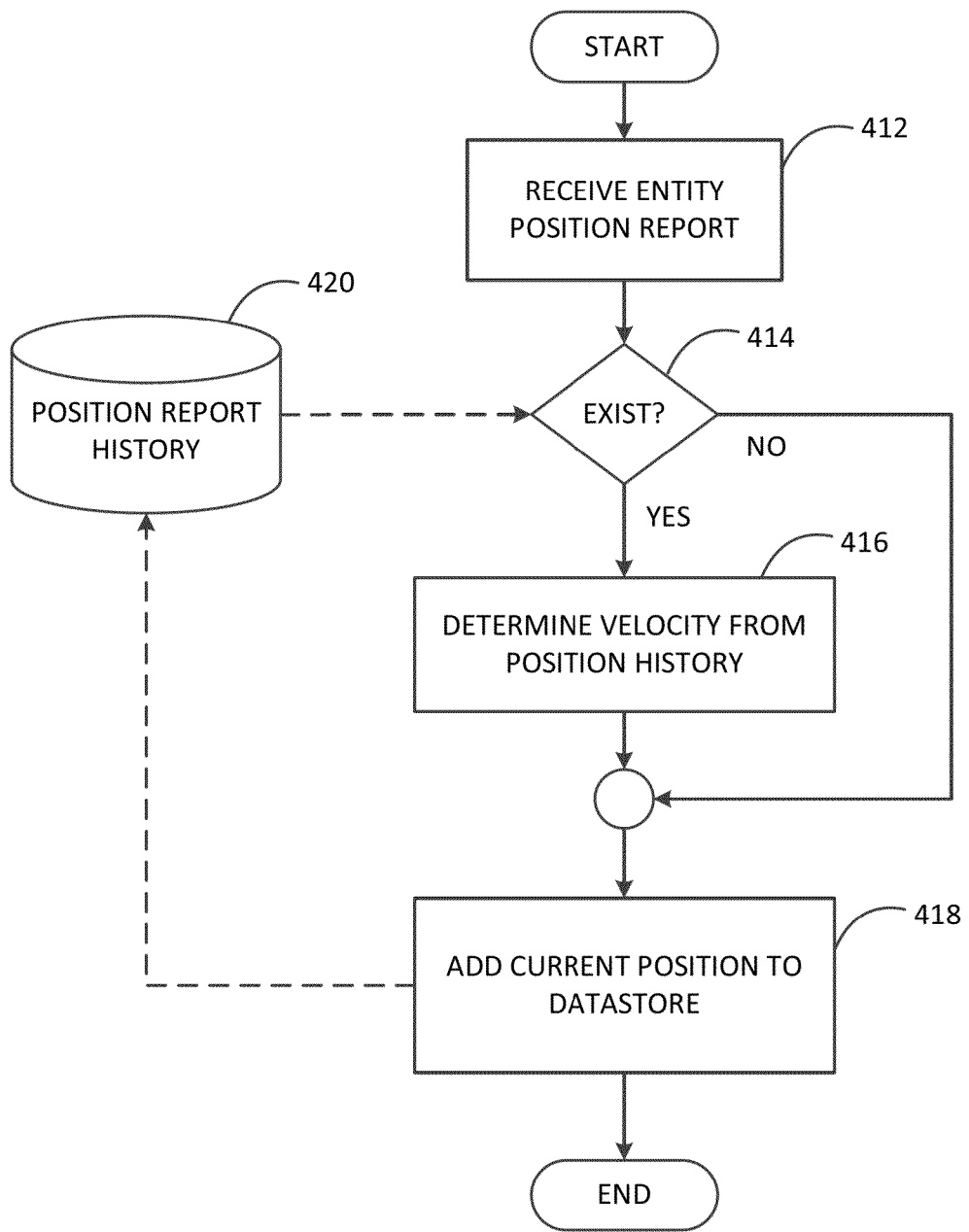
FIG. 4 is a flow chart of a process for determining a projected track of an entity in accordance with some embodiments of the invention.

FIG. 4 illustrates a process for determining a projected track for an entity based, at least in part, on a received entity report. In act 412 an entity report is received indicating a current position for the entity. The process proceeds to act 414 where it is determined whether position history information for the entity is stored by one or more datastores 420 configured to store position history reports for a plurality of entities in the area of interest. If it is determined in act 414 that position report history datastore 420 does not include an entry associated with the entity identified in the received entity position report, the process proceeds to act 418 where a new entry is added to the datastore 420 corresponding to the entity, and the current position of the entity is associated with the newly created entry. However, if it is determined in act 414 that position history information for the entity identified in the received entity report exists in datastore 420, the position history information is retrieved from datastore 420 and the process proceeds to act 416 where the projected track (e.g., velocity) of the entity is determined based, at least in part on the current position of the entity as indicated in the received entity report and the position history information retrieved from datastore 420. The projected track may be determined in act 416 in any suitable way. For example, in some embodiments, a linear regression filter may be used to estimate the velocity of the entity from the position history and the current position information for an entity. Such a filter may be able to smooth out the projected track over time by being able to ignore deceptive or errant position reports. As discussed above, an entity may attempt to trick a swarm attack algorithm by occasionally traveling in a direction that runs counter to the convergence hypothesis thereby potentially introducing an errant position report into the convergence analysis. Some embodiments may be configured to ignore or reduce the impact of such deceptive actions thereby improving the robustness of the convergence hypothesis process for detecting swarm attacks. For example, some embodiments may employ a Kalman filter that is used to estimate the general velocity of a projected track given a history of position measurements for an entity. A coefficient of determination $R^2$ may be used to measure the goodness of fit of the projected track to the position measurements in the history and position measurements with low $R^2$ values may be ignored when determining the projected track for the entity.

In some embodiments, the projected track for the entity may be determined by a velocity filter as discussed above and appropriate constraints may be applied to refine the projected track estimate based on a plurality of information sources. After determining the projected track for the entity, the process proceeds to act 418 where information related to the current position of the entity and/or the determined velocity information is stored by datastore 420. The exemplary process illustrated in FIG. 4 may be repeated at periodic intervals for each of a plurality of received entity reports and/or the process may be repeated continuously or in response to receiving a new entity report and aspects of the invention are not limited by the frequency with which position track(s) are determined for received entity reports.

Figure 5:
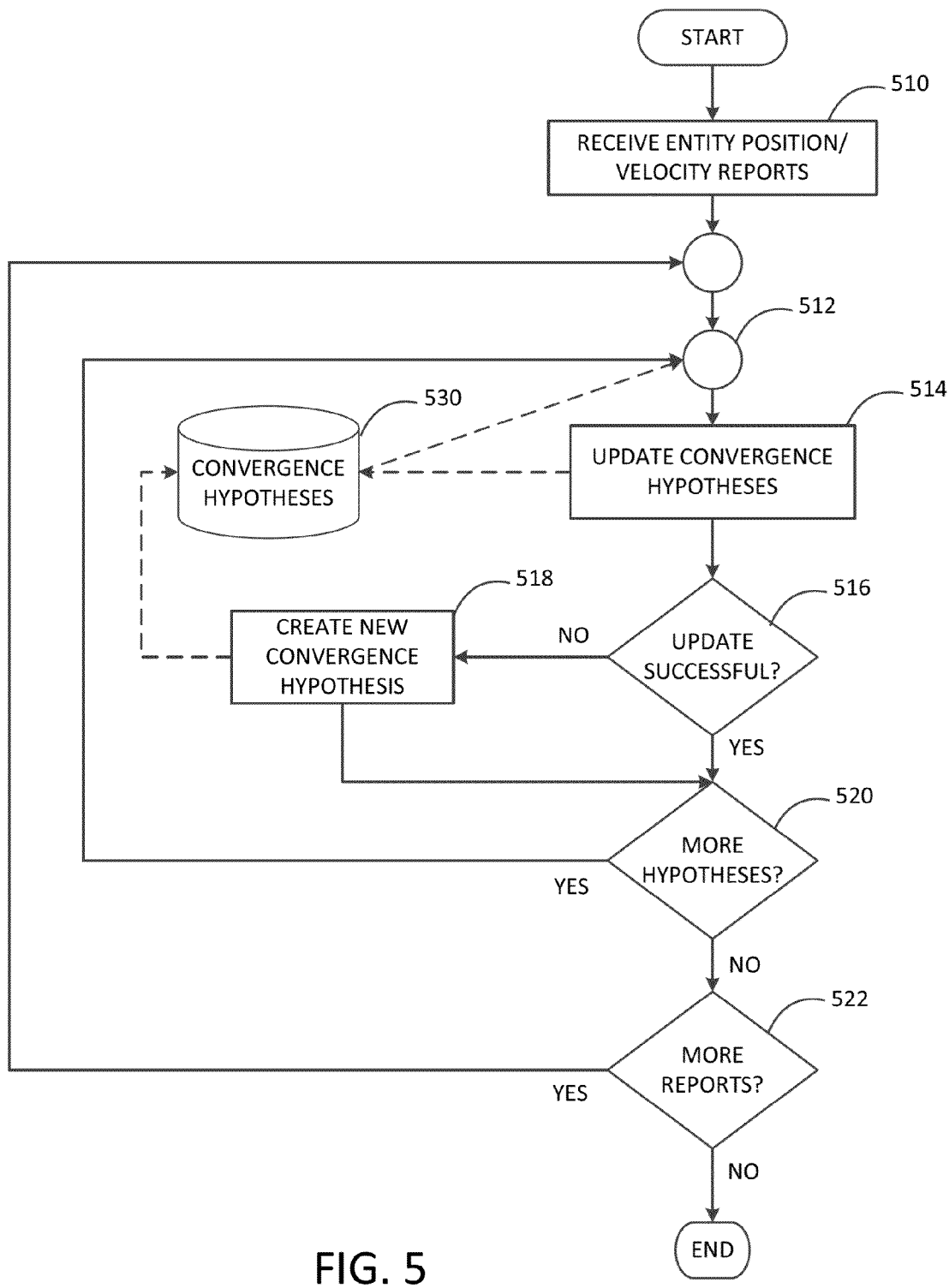
FIG. 5 is a flow chart of a process for updating a set of convergence hypotheses of a possible swarm attack in accordance with some embodiments of the invention.

As described above, after determining an updated (or new) position track for one or more entities in the area of interest, one or more convergence hypotheses in a set of hypotheses may be updated based on the determined position track information as illustrated in FIG. 5. In act 510, one or more entity position reports and/or velocity reports are received, which are used to update one or more convergence hypotheses. The process proceeds to act 512 where information corresponding to a convergence hypothesis is retrieved from a datastore 530 configured to store one or more data structures for storing the convergence hypothesis information for a set of convergence hypotheses. As discussed above, any suitable data structure or data structures may be used to store convergence hypothesis information. Exemplary data structure 300 shown in FIG. 3 and discussed above is used in the discussion of FIG. 5 merely for the purpose of illustration. Data structure 300 includes entity set field 310 which may be consulted in response to a request to retrieve a convergence hypothesis from convergence hypothesis datastore 530. For example, if the entity identified in the position or velocity report currently being processed is boat 120, in act 512, a request may be issued to datastore 530 for information related to one or more convergence hypotheses that identify boat 120 as being in the hypothesis entity set field. Provided that at least one convergence hypothesis is returned in response to the request, the process proceeds to act 514 where the retrieved convergence hypothesis is updated. For example, one or more fields associated with the convergence hypothesis may be updated based, at least in part, on one or more entity position and/or velocity reports. An exemplary process for updating a convergence hypothesis in accordance with some embodiments is discussed in more detail below with respect to FIG. 6.

The process then proceeds to act 516 where it is determined whether the update process was successful. If it is determined in act 516 that the process was not successful, the process proceeds to act 518 where a new convergence hypothesis is created based, at least in part, on the received entity position and/or velocity report(s). An exemplary process for creating a new convergence hypothesis is discussed in more detail below. The new convergence hypothesis is then sent to datastore 530 to be associated with the set of convergence hypotheses for a particular scenario.

If it is determined in act 516 that the update of the convergence hypothesis was successful or after creating a new convergence hypothesis in act 518, the process proceeds to act 520 where it is determined whether there are additional convergence hypotheses in the set of convergence hypotheses that should be updated based on the received entity report. As discussed above, this may be determined in some embodiments by determining if there are any convergence hypotheses in the set that identify the entity indicated in the entity report as being included in the hypothesis. If it is determined in act 520 that there is at least one additional convergence hypothesis in the set to update, the process returns to act 512 where the at least one additional convergence hypothesis is updated. This process continues until it is determined in act 520 that all convergence hypotheses related to the entity in the entity report have been updated.

In response to determining in act 520 that there are no more convergence hypotheses to update, the process proceeds to act 522 where it is determined if there are more entity reports to process. If it is determined that there are additional entity reports, the process repeats for the next entity report. This process continues until it is determined in act 522 that all entity reports have been processed, at which point the process ends.

Figure 6:
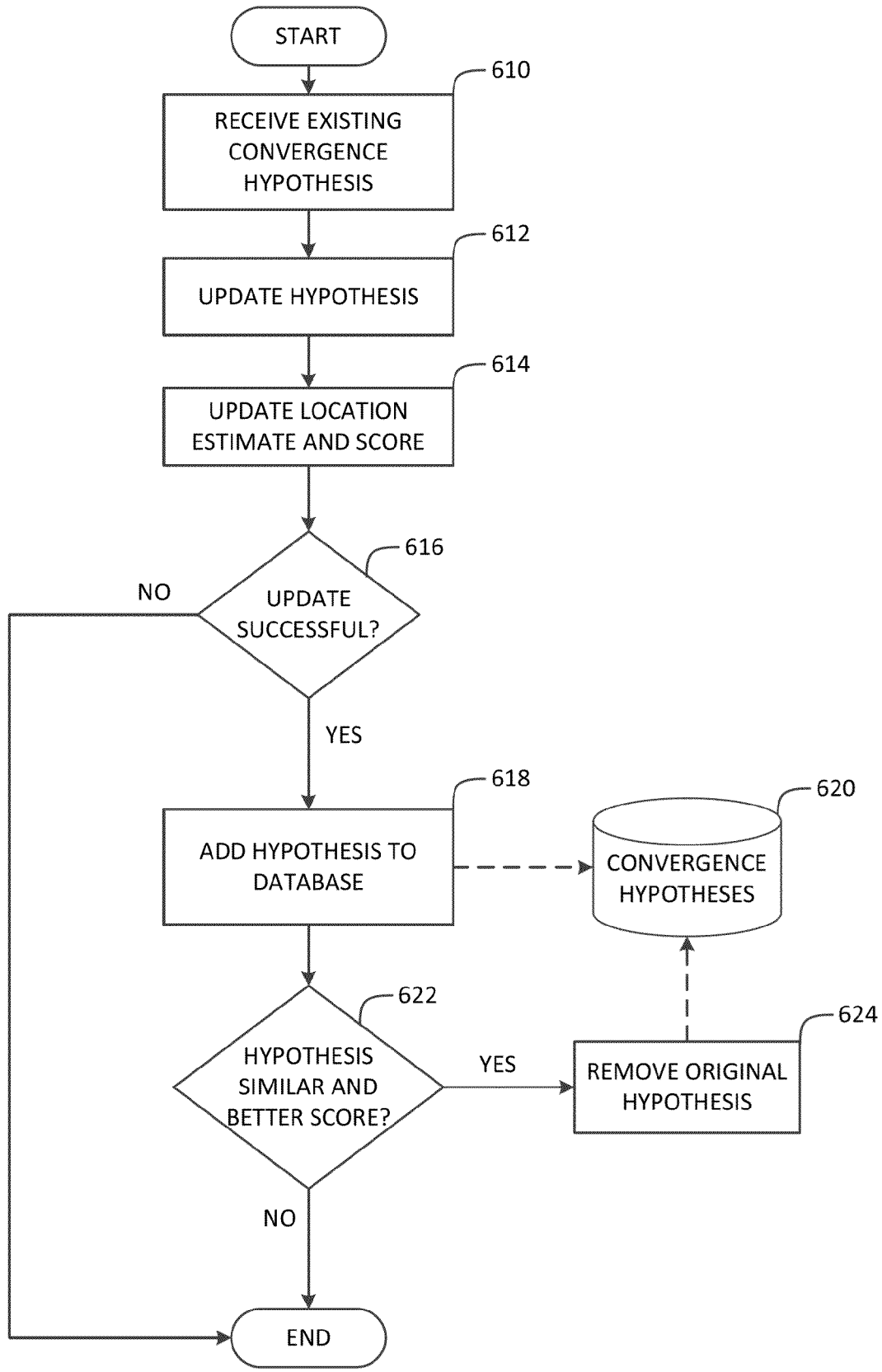
FIG. 6 is a flow chart of a process for updating a convergence hypothesis of a possible swarm attack in accordance with some embodiments of the invention.

FIG. 6 illustrates an exemplary process for updating an old convergence hypothesis stored in datastore 530 in accordance with some embodiments of the invention. In act 610 an existing convergence hypothesis is received from datastore 530 as discussed above. The process then proceeds to act 612 where the hypothesis is updated.

Figure 7:
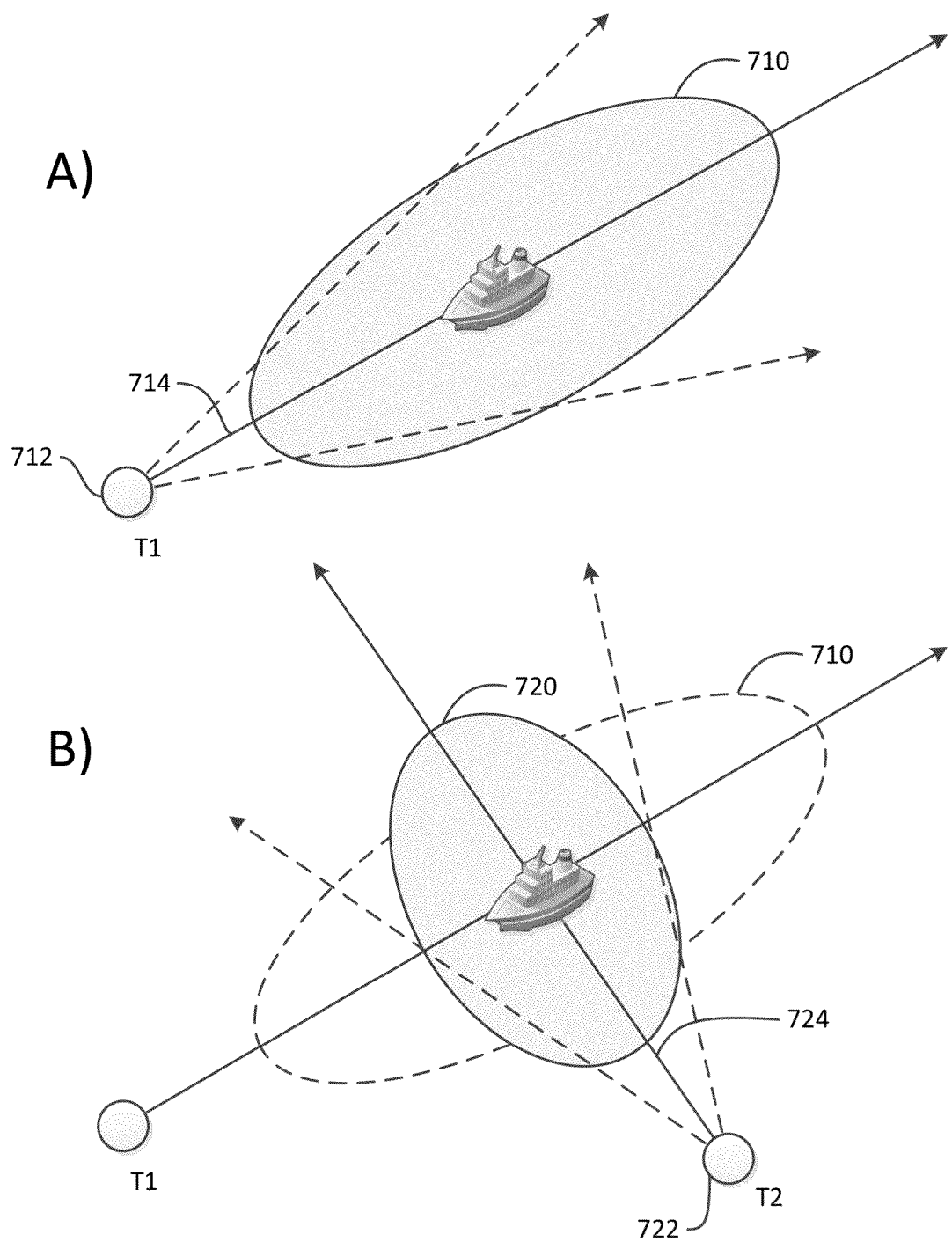
FIG. 7 is a schematic of a process for updating a convergence hypothesis in accordance with some embodiments of the invention.

FIG. 7 schematically illustrates a process for updating a convergence hypothesis in accordance with some embodiments of the invention. As illustrated in FIG. 7A, an initial convergence hypothesis 710 may be created from an initial entity position 712 and an initial entity velocity 714. As shown in FIG. 7B, the initial convergence hypothesis 710 may be updated resulting in updated convergence hypothesis 720, wherein the updating is based, at least in part, on a subsequent entity position 722 and a subsequent entity velocity 724. It should be appreciated that subsequent entity position and velocity information used to update a convergence hypothesis in accordance with some embodiments of the invention may relate to the same entity or a different entity as the initial entity position and velocity information used to create the initial convergence hypothesis.

As illustrated in FIG. 7, a convergence hypothesis may be illustrated schematically as an ellipse where the center of the ellipse describes the convergence location for the convergence hypothesis and the size of the ellipse describes the error associated with the convergence hypothesis based on the information in the entity reports on which the hypothesis is based. Accordingly, in this illustration, a convergence hypothesis associated with a small ellipse (e.g., ellipse 720) would be associated with less uncertainty than a convergence hypothesis associated with a larger ellipse (e.g., ellipse 710). In some embodiments, when the uncertainty is below a certain threshold indicating a good likelihood that the hypothesis is correct, the hypothesis may be output to reflect that the correlated movements of the entities in the hypothesis is a possible swarm attack.

An estimate of the convergence location and error may be determined in any suitable way and embodiments of the invention are not limited in this respect. In some embodiments the convergence location and error are determined using a Kalman filter that is initialized from one position and velocity measurement and is updated with subsequent position and velocity estimates as described above with respect to FIG. 7. In some embodiments, limitations on whether subsequent position and velocity estimates are used to update the convergence hypothesis may be applied to help ensure that information contained in spurious or deceptive reports do not affect the convergence detection processes. For example, a new projected track that would result in a dramatically changed convergence hypothesis may be considered an outlier and such information may not be used to update an existing convergence hypothesis. Other limitations may also be applied to guard against the inclusion of "noisy" data into the convergence hypothesis update process and embodiments of the invention are not limited in this respect.

Returning to the process of FIG. 6, after a convergence hypothesis has been updated in act 612, the process proceeds to act 614 where the location estimate and score for the convergence hypothesis is updated. As discussed in connection with FIG. 7, the introduction of additional position and velocity information based on projected tracks for one or more entities may result in an adjustment of the convergence location and the error associated with the convergence hypothesis, each of which may be updated in act 614 in a data structure associated with the convergence hypothesis. In act 614, an updated score representing a likelihood that the convergence hypothesis is correct may be determined. In some embodiments, the score may be calculated as a weighted sum of the likelihood that each track in the hypothesis is converging to the convergence location. An exemplary formula for calculating the score llh(H) for a hypothesis in accordance with some embodiments is as follows:

$$llh(H) = \sum_{t \in H} tR^2 \cdot llt(t, H), \text{ where}$$

$$llt(t, H) = \ln \frac{pr(t \mid t \to H)}{pr(t \mid \neg t \to H)}$$

After updating the location estimate and the score for the convergence hypothesis, the process proceeds to act 616 where it is determined if the update was successful. If it is determined that the update was not successful, the process ends. Otherwise, the process proceeds to act 618 where the updated convergence hypothesis is added to convergence hypothesis datastore 620.

The process then proceeds to act 622 where it is determined whether the updated hypothesis added to convergence hypothesis datastore 620 is similar to the convergence hypothesis before the update. A measure of similarity between the two hypotheses may be determined in any suitable way and embodiments of the invention are not limited in this respect. For example, in some embodiments, a comparison between the two hypotheses for similarity may include, but is not limited to, a comparison of the entities associated with each hypothesis and a comparison between the convergence locations and errors. If the degree of similarity between the updated hypothesis and the original hypothesis is less than a threshold value and the score associated with the updated hypothesis is greater than that for the original hypothesis, the process proceeds to act 624 where the original hypothesis (i.e., the hypothesis before the update) is removed from the convergence hypotheses datastore 620. Otherwise, if it is determined in act 622 that the updated hypothesis and the original hypothesis have a similarity measure that is greater than a threshold value, both the updated and the original convergence hypotheses may be maintained in the convergence hypothesis datastore 622 and the process ends.

Figure 8:
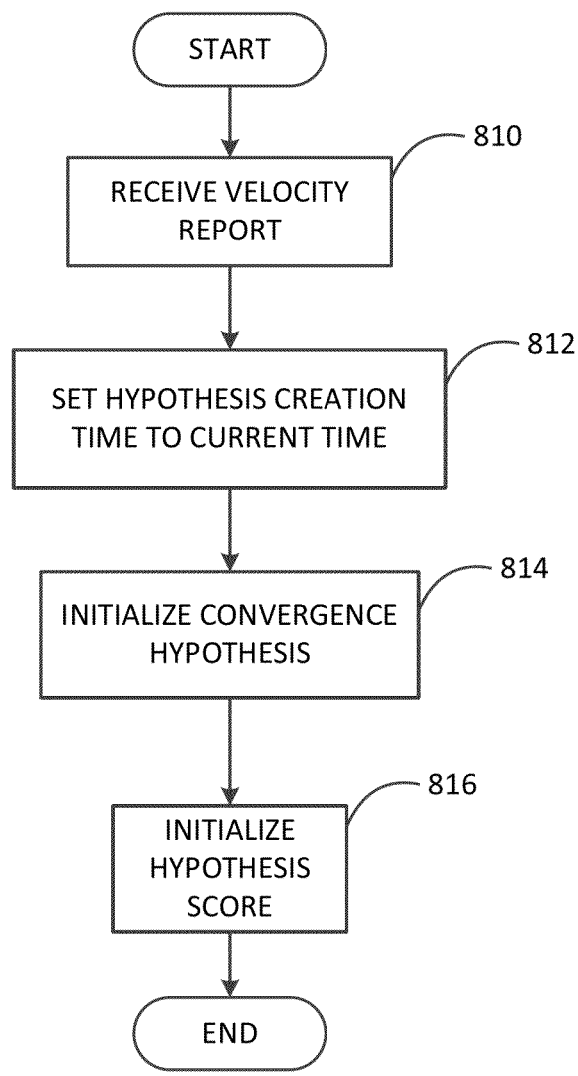
FIG. 8 is a flow chart of a process for creating a new convergence hypothesis in accordance with some embodiments of the invention.

In the discussion of FIG. 5, act 518 related to creating a new convergence hypothesis in response to determining that updating a convergence hypothesis was not successful. FIG. 8 provides more details regarding an exemplary process for creating a new convergence hypothesis in accordance with some embodiments of the invention. In act 810 an entity velocity report describing a projected track for an entity is received. In response to receiving the entity velocity report, the process proceeds to act 812 where one or more data structures corresponding to a new convergence hypothesis is created and the hypothesis creation time is set to the current time corresponding to when the convergence hypothesis was created. As discussed above, and discussed in more detail below, the creation time for a convergence hypothesis may be used in some embodiments to decide which hypotheses are the oldest and may be removed from the convergence hypothesis datastore, if necessary.

The process then proceeds to act 814 where the elements of the convergence hypothesis are initialized based on the information in the position and/or velocity report. For example, an initial convergence location and error is determined as illustrated in FIG. 7A. These initial values are stored as information associated with the convergence hypothesis in the convergence hypothesis datastore. After initializing the state values for the new convergence hypothesis, the process proceeds to act 816 where the score associated with the hypothesis is initialized (e.g., set to zero) to indicate that the convergence hypothesis is a new hypothesis based only on one measurement. As discussed in more detail below, depending on the resource limitations of a particular implementation of the automated swarm attack detection method in accordance with some embodiments of the invention, hypotheses having low scores may be chosen for deletion from the convergence hypothesis datastore, if necessary.

As discussed above, in some implementations of embodiments of the invention, computational and/or storage resources may be limited. The inventors have realized that this constraint may be addressed by reducing the number of convergence hypotheses in a set of hypotheses. That is, in some implementations, rather than storing one convergence hypothesis for each possible set of projected entity tracks in an area of interest, only a subset of all possible hypotheses may be stored. For example, hypotheses that are unlikely to be correct may be removed from the convergence hypothesis datastore.

Figure 9:
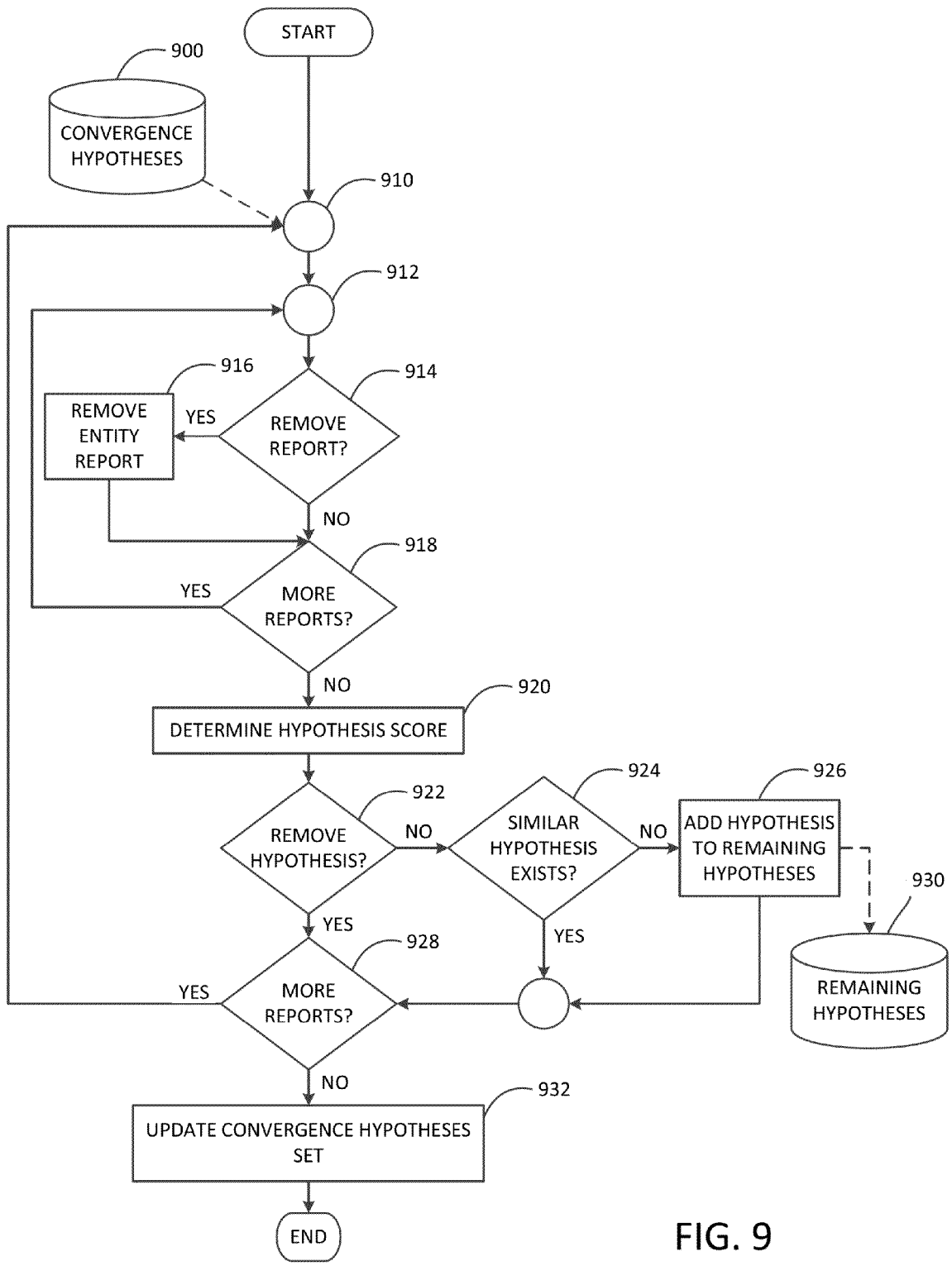
FIG. 9 is a flow chart of a process for analyzing a set of convergence hypotheses for a particular scenario in accordance with some embodiments of the invention.

FIG. 9 illustrates an exemplary process for reducing the number of convergence hypotheses in a set of convergence hypotheses in accordance with some embodiments of the invention. In act 910 information corresponding to a first convergence hypothesis in the set is retrieved from convergence hypothesis datastore 900. In some embodiments, the information corresponding to a convergence hypothesis includes a plurality of entity reports that include information on projected tracks of entities used to form the convergence hypothesis.

After retrieving information for a first convergence hypothesis, the process proceeds to act 912 where a first entity report associated with the selected hypothesis is selected for analysis. The process then proceeds to act 914 where it is determined whether the selected entity report should be removed based, at least in part, on the creation time of the entity report. In some embodiments, it may be determined in act 914 that the entity report should be removed when the current time minus the creation time of the entity report is greater than a threshold value (e.g., entity reports older than one hour may be removed). In some embodiments, a decision on whether to remove an entity report may be made based, at least in part on a history size for storing entity reports. For example, in one implementation, it may be determined in act 914 that the entity report should be removed when the creation time of the entity report is less than the current time minus the history size. Other methods for determining whether to remove an entity report from a convergence hypothesis are also possible and embodiments of the invention are not limited in this respect.

If it is determined in act 914 that the selected entity report should be removed, the process proceeds to act 916 where the entity report is removed from the information associated with the convergence hypothesis. Otherwise, if it is determined in act 914 not to remove the entity report, the process proceeds to act 918 where it is determined whether there are additional entity reports associated with the selected convergence hypothesis. If it is determined in act 918 that there are additional reports, the process returns to act 912 where a different entity report is selected for processing. Otherwise, if it is determined in act 918 that there are no more entity reports associated with the convergence hypothesis, the process proceeds to act 920 where a hypothesis score for the updated convergence hypothesis is determined. As discussed above, the score associated with a convergence hypothesis reflects the likelihood that the hypothesis is correct. The score may be determined in any suitable way including, but not limited to, using the formulas discussed above with respect to calculating a score in the process shown in FIG. 6. Additionally, in some embodiments the score may be updated based, at least in part, on the creation time of the hypothesis such that the score associated with the hypothesis is decreased as the hypothesis becomes older. In some embodiments, the score may also be determined based, at least in part, on whether the hypothesis was updated, with the score being decreased for hypotheses that were not updated.

After a score for the convergence hypothesis has been determined, the process proceeds to act 922 where it is determined whether the hypothesis should be removed from the set of hypotheses for the particular scenario that is being monitored for possible swarm attacks. In some embodiments this determination may be based, at least in part on a creation time of the convergence hypothesis. Other factors may also be used to determine whether to remove a convergence hypothesis. These factors include, but are not limited to, a probation time used to ensure that newer hypotheses are not removed and the score associated with the hypothesis. For example, in some embodiments, it may be determined in act 922 to remove a hypothesis if the current time minus the hypothesis creation time is greater than the probation time and if the hypothesis score is less than a threshold value. It should be appreciated that other formulas may also be used in determining whether to remove a hypothesis and embodiments are not limited in this respect. For example, in some embodiments the determination to remove a hypothesis may not depend on the score associated with the hypothesis or may only depend on the score associated with the hypothesis.

If it is determined in act 922 that the hypothesis should be removed, the process proceeds to act 928 where it is determined whether there are additional hypotheses in the set of convergence hypotheses. Otherwise, if it is determined in act 922 that the updated hypothesis does not meet the criteria for removal, the process proceeds to act 924 where it is determined whether the selected hypothesis is similar to another convergence hypothesis that has already been retained in the set of convergence hypotheses. In some embodiments, convergence hypotheses that are retained in the set of convergence hypotheses may be stored in remaining hypotheses datastore 930. Alternatively, information associated with the retained hypotheses may be updated to reflect that these hypotheses are to be retained in the set. For example, each hypothesis may be associated with metadata and the metadata may be updated to reflect the retained status of the hypothesis.

A measure of similarity determined in act 924 between the selected hypothesis and other retained hypotheses may be made in any suitable way including, but not limited to, performing a comparison of the entities associated with each hypothesis and a comparison between the convergence locations and errors. If the degree of similarity between the two hypotheses is less than a threshold value, it may be determined in act 924 to only retain one of the two hypotheses. For example, in some embodiments, the hypothesis with the larger score may be retained and the other hypothesis may be removed. Otherwise, if it is determined in act 924 that there is not a retained hypothesis similar enough to the selected hypotheses, the process proceeds to act 926 where the selected hypothesis becomes a retained hypothesis in the set of hypotheses for the particular scenario. As discussed above, designating a hypothesis as a retained hypothesis may be accomplished in any of a variety of ways including, but not limited to, storing the retained hypothesis in retained hypothesis datastore 930 and/or updating information (e.g., metadata) associated with the hypothesis to indicate the retained status of the hypothesis within the set.

After removing the hypothesis or determining that the hypothesis should be retained, the process proceeds to act 928 where it is determined whether additional hypotheses in the set of hypotheses remain to be processed. If it is determined in act 928 that additional hypotheses are to be processed, the process returns to act 910 where a new hypothesis is selected and the process repeats until it is determined in act 928 that no more hypotheses are left in the set of hypotheses to be processed. When it is determined in act 928 that there are no more hypotheses left in the set of hypotheses, the process proceeds to act 932 where the set of convergence hypotheses for the particular scenario is updated to include only the hypotheses that were identified as being retained. For example, the remaining hypotheses stored in remaining hypothesis datastore 930 may replace the convergence hypotheses stored in convergence hypothesis datastore 900 prior to instantiating the hypothesis removal process of FIG. 9. The updated set of convergence hypotheses may then analyzed as discussed in act 218 of the process illustrated in FIG. 2, to determine whether any of the hypotheses in the set should be output based, at least in part, on the score associated with the hypothesis.

Figure 10:
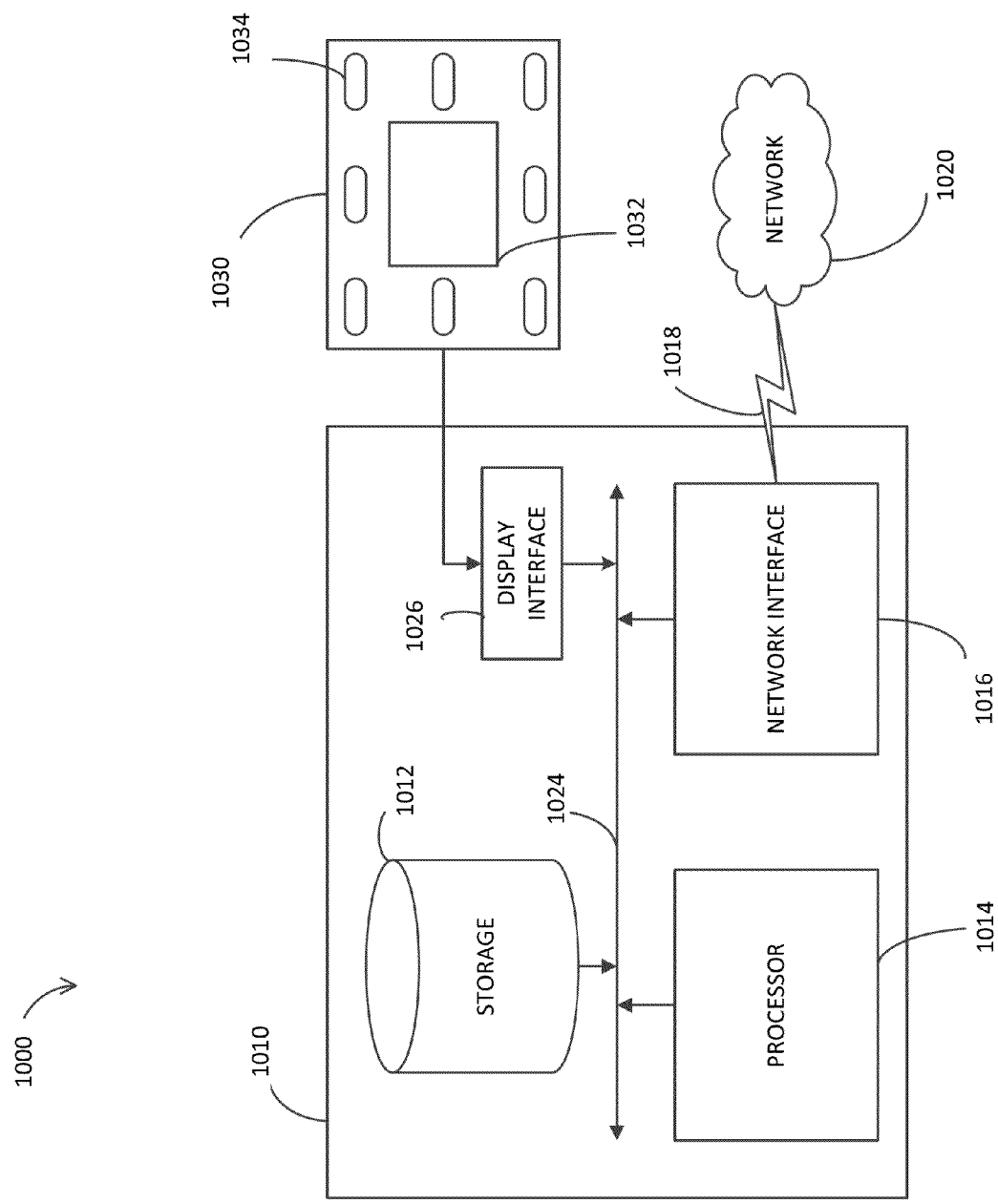
FIG. 10 is an exemplary computer system environment in which some embodiments of the invention may be implemented.

FIG. 10 illustrates an example of a suitable computing system environment 1000 on which some embodiments may be implemented. The exemplary computing system environment 1000 includes a general purpose computing device in the form of a computer 1010. Components of the computer may include, but are not limited to, one or more storage devices 1012, a controller 1014, such as one or more programmable processors, a network interface 1016, a display interface 1026, and a system bus 1024 that couples various system components to the controller 1014. The system bus 1024 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The storage device 1012 may include volatile and/or nonvolatile memory such as read only memory (ROM), random access memory (RAM), or any other type of removable/non-removable, volatile/nonvolatile memory including, but not limited to, magnetic tape cassettes, flash memory card, digital versatile disks, digital video tape, solid state RAM, solid state ROM, and the like. The network interface 1016 may be configured to communicate with one or more remote computers via a network 1020 using any suitable network communication protocol. For example network interface may comprise a wireless transmitter and a wireless receiver for communicating with a remote computer other other-network connected device via network 1020 using wireless communication link 1018.

In some embodiments, computing system environment 1000 further comprises a display unit 1030 connected to the system bus 1024 via display interface 1026. Display unit 1030 may comprise a display 1032, such as a liquid crystal display (LCD), and one or more controls 1034, which when actuated transmit signals to the computer 1010 via the display interface 1026. The controls 1034 may include pushbuttons, sliders, toggle switches, or any other suitable control. It should be appreciated that although the controls 1034 are shown as part of display unit 1030, the controls 1034 may alternatively be external to the display unit 1030 and may be connected to system bus 1024 in any suitable manner via any suitable input/output interface.

It should be appreciated that the computing system environment 1000 is not limited to the components illustrated in the exemplary environment 1000 and any other additions, deletions, or modifications to the components or combinations of components illustrated in FIG. 10 may also be used. Computing system environment 1000 may be integrated within a manned or unmanned vehicle including, but not limited to, a watercraft, an aircraft, and a land-based vehicle. Additionally, in some embodiments, computing system environment 1000 may also be embodied as a portable device carried, for example, by a soldier in an urban warfare scenario to alert the soldier to possible swarm attacks.

Having thus described several aspects of some embodiments of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory tangible computer readable storage medium (or multiple computer-readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable storage media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of determining a convergence location of a plurality of tracked entities in a detection scenario, the method comprising:
   storing, in at least one datastore, a set of convergence hypotheses for the detection scenario, wherein each of the convergence hypotheses in the set is associated with a plurality of entities being tracked, a convergence location estimate, a convergence location error, and a score indicating a likelihood that the convergence hypothesis is correct;
   receiving a position report for at least one entity that is being tracked within an area of interest for the detection scenario;
   determining, with at least one processor, a projected track of the at least one entity based, at least in part, on a position history of the at least one entity;
   updating a first convergence hypothesis in the set of convergence hypotheses based, at least in part, on the determined projected track of the at least one entity, wherein updating the first convergence hypothesis comprises updating the convergence location estimate for the first convergence hypothesis, the score for the first convergence hypothesis, or the convergence location estimate for the first hypothesis and the score for the first convergence hypothesis, wherein the convergence location estimate for the first convergence hypothesis is determined based, at least in part, on projected tracks of the plurality of entities being tracked for the first convergence hypothesis; and
   outputting the first convergence hypothesis when the updated score for the first convergence hypothesis exceeds a threshold value.

2. The method of claim 1, wherein determining a projected track of the at least one entity comprises determining a current position and velocity of the at least one entity.

3. The method of claim 1, wherein determining a projected track of the at least one entity comprises:
   determining whether an entry for the at least one entity exists in the at least one datastore; and
   determining the projected track of the at least one entity as the current position of the at least one entity in response to determining that an entry for the at least one entity does not exist in the at least one datastore.

4. The method of claim 1, further comprising:
   generating a new convergence hypothesis based, at least in part, on the projected track of the at least one entity;
   comparing the new convergence hypothesis to an old convergence hypothesis stored in at least one datastore; and
   determining whether to replace the old convergence hypothesis with the new convergence hypothesis based, at least in part, on the comparison between the new convergence hypothesis and the old convergence hypothesis.

5. The method of claim 4, wherein comparing the new convergence hypothesis to an old convergence hypotheses comprises:
   determining a measure of similarity between the new convergence hypothesis and the old convergence hypothesis; and
   determining whether a score associated with the new convergence hypothesis is greater than a score associated with the old convergence hypothesis.

6. The method of claim 5, wherein determining whether to replace the old convergence hypothesis with the new convergence hypotheses comprises determining to replace the old convergence hypothesis with the new convergence hypothesis when the measure of similarity is above a predetermined threshold and when the score associated with the new convergence hypothesis is greater than the score associated with the old convergence hypothesis.

7. The method of claim 4, further comprising:
   determining whether the new convergence hypothesis is a viable hypothesis; and
   storing, in response to determining that the new convergence hypothesis is a viable hypothesis, the new convergence hypothesis in the at least one datastore.

8. The method of claim 1, further comprising:
   accessing from the at least one datastore, the set of convergence hypotheses;

determining based, at least in part, on at least one measure associated with the at least one convergence hypothesis, whether at least one of the convergence hypotheses in the set should be removed from the set; and updating the set of convergence hypotheses by removing the at least one convergence hypothesis from the set when the at least one measure is above a predetermined threshold.

9. The method of claim 8, wherein the at least one measure is selected from the group consisting of a time when the at least one convergence hypothesis was created, a score associated with the at least one convergence hypothesis, and a similarity measure between the at least one convergence hypothesis and at least one other convergence hypothesis in the set.

10. The method of claim 8, further comprising:
determining whether the score associated with any of the hypotheses in the updated set of convergence hypotheses is greater than a threshold value; and
outputting at least one hypothesis in the updated set in response to determining that the score associated with the at least one hypothesis greater than the threshold value.

11. The method of claim 1, wherein the at least one entity that is being tracked is selected from the group consisting of a person, a manned vehicle, and an unmanned vehicle.

12. The method of claim 1, further comprising:
determining an identity of a plurality of entities associated with the first convergence hypothesis; and
outputting the identity of the plurality of entities associated with the first convergence hypothesis.

13. A non-transitory computer-readable storage medium encoded with a plurality of instructions that, when executed by at least one processor, perform a method comprising:
storing, in at least one datastore, a set of convergence hypotheses for a detection scenario, wherein each of the convergence hypotheses in the set is associated with a plurality of entities being tracked, a convergence location estimate, a convergence location error, and a score indicating a likelihood that the convergence hypothesis is correct;
receiving a position report for at least one entity that is being tracked within an area of interest for the detection scenario;
determining a projected track of the at least one entity based, at least in part, on a position history of the at least one entity;
updating a first convergence hypothesis in the set of convergence hypotheses based, at least in part, on the determined projected track of the at least one entity, wherein updating the first convergence hypothesis comprises updating the convergence location estimate for the first convergence hypothesis, the score for the first convergence hypothesis, or the convergence location estimate for the first hypothesis and the score for the first convergence hypothesis, wherein the convergence location estimate for the first convergence hypothesis is determined based, at least in part, on projected tracks of the plurality of entities being tracked for the first convergence hypothesis; and
outputting the first convergence hypothesis when the updated score for the first convergence hypothesis exceeds a threshold value.

14. The computer-readable storage medium of claim 13, wherein determining a projected track of the at least one entity comprises determining a current position and velocity of the at least one entity.

15. The computer-readable storage medium of claim 13, wherein the method further comprises:
generating a new convergence hypothesis based, at least in part, on the projected track of the at least one entity;
comparing the new convergence hypothesis to an old convergence hypothesis stored in the at least one datastore; and
determining whether to replace the old convergence hypothesis with the new convergence hypothesis based, at least in part, on the comparison between the new convergence hypothesis and the old convergence hypothesis.

16. The computer-readable storage medium of claim 13, wherein the method further comprises:
accessing from the at least one datastore, the set of convergence hypotheses;
determining based, at least in part, on at least one measure associated with the at least one convergence hypothesis, whether at least one of the convergence hypotheses in the set should be removed from the set; and
updating the set of convergence hypotheses by removing the at least one convergence hypothesis from the set when the at least one measure is above a predetermined threshold.

17. A computer system comprising:
at least one storage device configured to store a set of convergence hypotheses for a detection scenario, wherein each of the convergence hypotheses in the set is associated with a plurality of entities being tracked, a convergence location estimate, a convergence location error, and a score indicating a likelihood that the convergence hypothesis is correct; and
at least one processor programmed to:
receive a position report for at least one entity that is being tracked within an area of interest for the detection scenario;
determine a projected track of the at least one entity based, at least in part, on a position history of the at least one entity;
update a first convergence hypothesis in the set of convergence hypotheses based, at least in part, on the determined projected track of the at least one entity, wherein updating the first convergence hypothesis comprises updating the convergence location estimate for the first convergence hypothesis, the score for the first convergence hypothesis, or the convergence location estimate for the first hypothesis and the score for the first convergence hypothesis, wherein the convergence location estimate for the first convergence hypothesis is determined based, at least in part, on projected tracks of the plurality of entities being tracked for the first convergence hypothesis; and
output the first convergence hypothesis when the updated score for the first convergence hypothesis exceeds a threshold value.

18. The computer system of claim 17, wherein determining a projected track of the at least one entity comprises determining a current position and velocity of the at least one entity.

19. The computer system of claim 17, wherein the at least one processor is further programmed to:
generate a new convergence hypothesis based, at least in part, on the projected track of the at least one entity;
compare the new convergence hypothesis to an old convergence hypothesis stored on the at least one storage device; and determining whether to replace the old convergence hypothesis with the new convergence hypothesis based, at least in part, on the comparison between the new convergence hypothesis and the old convergence hypothesis.

20. The computer system of claim 19, wherein the at least one processor is further programmed to:
   determine whether the score associated with any of the hypotheses in the set of convergence hypotheses is greater than a threshold value; and
   output at least one hypothesis in the set in response to determining that the score associated with the at least one hypothesis is greater than the threshold value.

* * * * *